United States Patent [19]

Congleton et al.

[11] 4,260,957
[45] Apr. 7, 1981

[54] USE OF MULTIPLE BEAMS FROM FREQUENCY AUGMENTED LASER RADIATION

[75] Inventors: Robert S. Congleton; Edmond B. Treacy, both of Richland, Wash.

[73] Assignee: Jersey Nuclear-Avco Isotopes, Inc., Bellevue, Wash.

[21] Appl. No.: 862,410

[22] Filed: Dec. 20, 1977

[51] Int. Cl.² .............................................. H01S 3/10
[52] U.S. Cl. ............................................. 331/94.5 N
[58] Field of Search ............... 331/94.5 C, 94.5 N; 307/88.3, 424, 425

[56] References Cited

U.S. PATENT DOCUMENTS

| | | | |
|---|---|---|---|
| 3,975,693 | 8/1976 | Barry et al. | 331/94.5 C |
| 4,048,515 | 9/1977 | Liu | 307/88.3 |
| 4,127,827 | 11/1978 | Barry | 331/94.5 C |

Primary Examiner—William L. Sikes
Attorney, Agent, or Firm—Weingarten, Maxham & Schurgin

[57] ABSTRACT

A system for making optimum use of frequency shifted radiation by extracting both front and back travelling frequency shifted radiation beams. The two extracted laser beams are later combined in the same polarization for energization of a dye laser channel or cell for increased pumping efficiency in the dye laser operation. Additionally, where the generating cavity for the two beams is mode locked, the two extracted beams may be applied to the dye laser cell in time staggered manner in order to maintain the stability of subsequent amplification stages between pulses.

28 Claims, 5 Drawing Figures

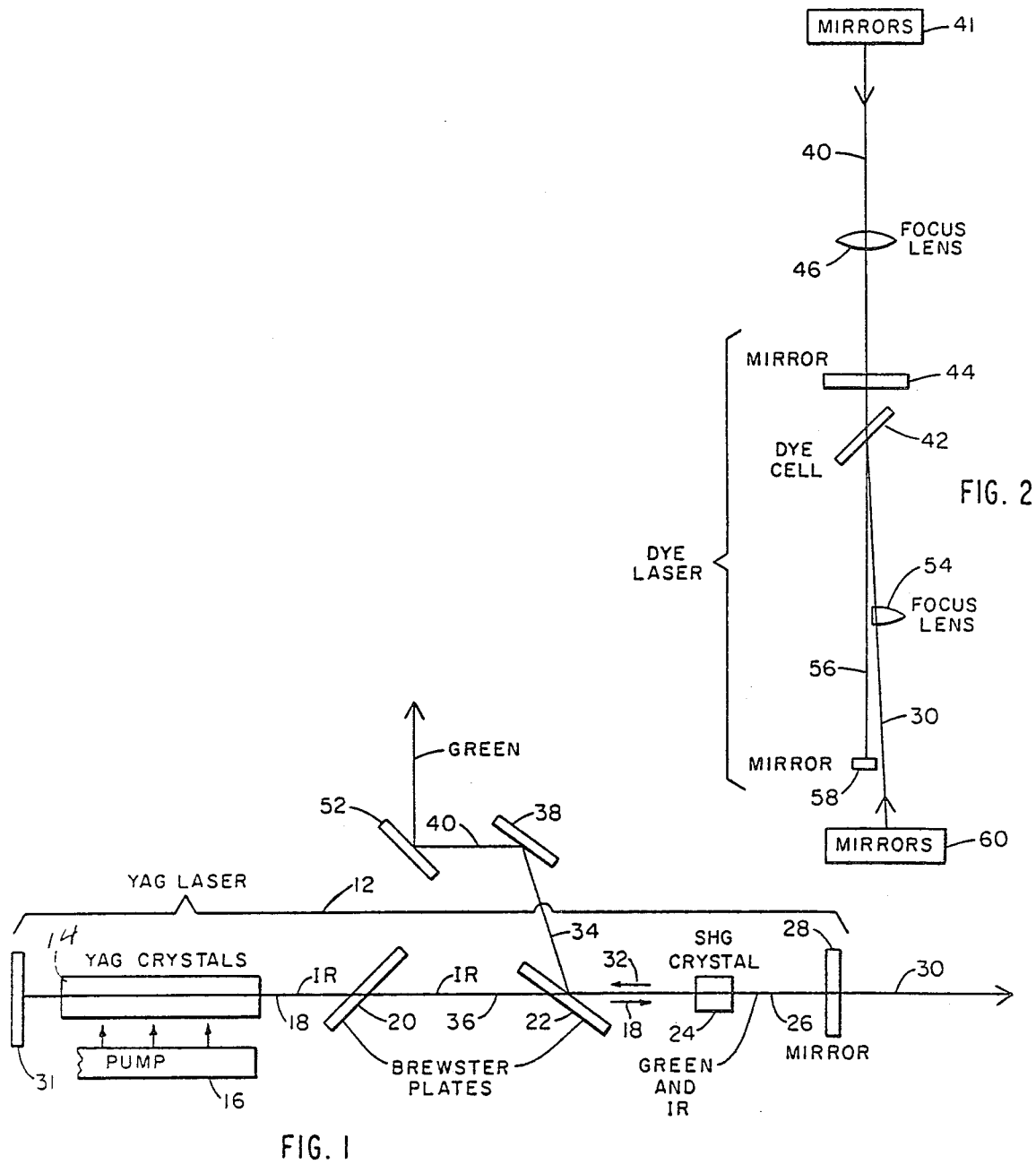

USE OF MULTIPLE BEAMS FROM FREQUENCY AUGMENTED LASER RADIATION

FIELD OF THE INVENTION

The present invention relates to method and apparatus for extracting frequency shifted radiation along both directions of an optical axis containing original, and frequency shifted radiation.

BACKGROUND OF THE INVENTION

In the technique of isotope separation by laser induced, isotopically selective photoexcitation and ionization, laser radiation of desired frequencies is typically developed by amplifying and pulse combining the output of one or more master oscillators. These master oscillators are typically operated with an output frequency in the red-to-orange spectral region from the lasing of a flowing dye solution. A practical absorption frequency for exciting such a dye solution for lasing in the red-orange region lies in the green spectral range.

One technique employed to achieve the pumping or excitation radiation for a master oscillator under these circumstances is to employ the infrared radiation provided by the crystals of a YAG laser, which is of a frequency substantially lower than that required for master oscillator excitation in the green and to frequency shift the radiation by doubling its frequency through a second harmonic generator. The radiation passing through the crystal has both green and infrared frequencies. A laser cavity output mirror placed on the far side of the frequency doubling crystal can then be tuned to reflect the infrared while passing the green radiation for use in excitation of the master oscillator.

The output radiation pulses from such a master oscillator are preferably closely spaced in order to permit efficient amplifier operation and to reduce the possibility of amplifier self-oscillation.

BRIEF SUMMARY OF THE INVENTION

In accordance with the teaching of the present invention a system is shown for extracting and utilizing not only the beam of green radiation passing through the output mirror of a frequency doubled YAG laser, but also the oppositely travelling cavity green beam. In view of the fact that infrared radiaton passes in both directions along the optical axis of the YAG laser cavity through the frequency doubling crystal and generates green radiation travelling in both directions, a system is shown for extracting the oppositely travelling green radiation and, additionally, for making utilization of that radiation typically for excitation of the flowing dye laser medium of the master oscillator.

In the case where the infrared beam is at least partially mode locked, the first and second green beams are composed of individual pulses. The two beams are then applied to the master oscillator medium with an appropriate delay to insure that the pulses are temporally interleaved in their application to the medium.

BRIEF DESCRIPTION OF THE DRAWING

These and other features of the present invention are more fully set forth below in the detailed description, presented for purposes of illustration and not by way of limitation, and in the accompanying drawing of which:

FIG. 1 is a schematic diagram of a system for extracting oppositely travelling frequency doubled radiation;

FIG. 2 is a schematic diagram of dye laser pumping system utilizing the extracted radiation according to the invention;

DETAILED DESCRIPTION OF THE INVENTION

Figure 3:
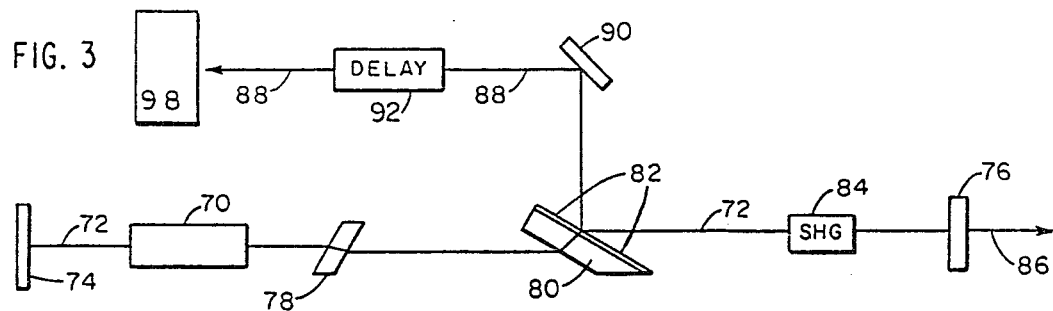
FIG. 3 is a schematic diagram of a first alternative to the diagram of FIG. 1.

The present invention contemplates a system for extracting and using for excitation purposes previously wasted radiation from a laser cavity in which a laser beam generated by stimulated decay is frequency shifted by a frequency shift element located within the cavity. In particular, the frequency shifted radiation will accompany the originally generated radiation throughout the cavity, passing in both directions through the frequency shift element but is normally extracted in only one direction. The unextracted frequency shifted radiation travelling within the cavity is of no further use, in contrast to the radiation of the original frequency produced by stimulated emission which may still be frequency doubled or used for amplification as is typical within the cavity.

In the case where the invention is applied to isotope separation and the frequency shifted radiation is employed to drive a master oscillator laser at a high pulse rate, the present system by extracting both directions of frequency shifted radiation, permits an improvement in efficiency by augmenting the amount of frequency shifted radiation which may be applied to excite the master oscillator. It is also possible to time delay one set of pulses and merge them temporally to provide an augmented pulse rate.

With particular reference now to FIG. 1 of the drawing, there is shown a typical YAG laser 12 having yttrium aluminum garnet crystals 14 excited by a pump source 16, typically a continuous arc discharge. The excited crystals 14 will lase, periodically at a high rate, generating an output beam 18 of high repetition rate infrared radiation pulses. This radiation is applied through first and second inclined Brewster plates 20 and 22 for purposes to be explained below and on through a frequency shifting crystal 24, which, in the application of isotope separation, is a frequency doubling element typically consisting of a lithium iodate crystal.

The Brewster plates 20 and 22 are provided to adjust the polarization in the beam 18 of infrared radiation to a predetermined polarization, typically vertical in the side view of FIG. 1, to permit alignment of crystal 24 for frequency doubling of the radiation. In this case, the radiation passing through the crystal 24 in a beam 26 will include both the original infrared as well as frequency doubled radiation, typically in the green spectral region.

One cavity reflector for the YAG laser 12 is provided by an output mirror 28 which is typically a layered dielectric employed to pass the green beam in the radiation 26 but to reflect the infrared radiation. A green output beam 30 of high pulse rate is thus provided by the mirror 28. The infrared radiation reflected by the mirror 28 will again traverse the crystal 24 back through the YAG crystals 14 for reflection by a 100% reflector 31. The infrared radiation thus travels back and forth within the cavity of the YAG laser, building in amplitude to the point where the conversion by crystal 24 extracts as much energy as is added by each amplifying pass.

As may be now appreciated, the second harmonic crystal 24 will produce a second green beam of radiation in combination with the infrared radiation as a part of reflected beam 32 oppositely travelling through the crystal 24. This second green beam is directed toward the Brewster plate 22.

In order to extract and make use of this green beam which would otherwise be wasted within the cavity, a dielectric coating is placed upon the Brewster plate 22 to reflect it at an angle as a beam 34 with a minimal disturbance to the infrared beam which then passes on through the plate 22 as a beam 36.

The beam 34 is preferably filtered once more by a tuned dielectric coating on a mirror 38 to remove any remaining infrared and is then available as a second output of green radiation in an output beam 40.

The beams 30 and 40 are then combined as excitation for a further laser as illustrated in FIG. 2, a top view. In the embodiment illustrated, this is accomplished by applying the beam 40 after transport by suitable mirrors 52 and 41 to a dye channel or dye cell 42 through an end mirror 44 defining one end of the cavity for the dye cell 42. The mirror 44 is tuned to reflect radiation generated by the dye cell 42, typically generated in the red-orange spectral region. For this purpose cell 42 has as a lasing medium a flowing dye solution, like rhodamine 6G. The beam 40, directed through the mirrors 41 is focused by a lens 46 for application to the dye cell 42. The mirrors 41 are oriented to maintain the horizontal polarization in the beam 30 for injection into the dye cell 42. This is a preferable orientation in the case where the dye within the cell 42 is flowing in a vertical direction, that is out of the page.

The other beam, output beam 30, the normal output for the frequency doubled YAG laser, is then applied to the dye cell 42 through a focusing lens 54 displaced slightly off axis 56, and truncated to avoid the optical axis 56 for the dye cell 42. A mirror 58 placed along the axis 56 defines the end of the cavity opposite mirror 44 for the dye laser, and may serve as the output mirror. The beam 30 is also reflected by mirrors 60 for application through the lens 54 to the dye cell 42. Mirrors 60 maintain the horizontal polarization for that beam. Beam 30 may also be applied in the manner of the beam 40.

Alternatively, the system for extracting two frequency doubled beams from the YAG laser may be operated in at least a partially mode locked arrangement according to known techniques in which the cavity includes a loss modulator for insuring that radiation is generated at moments corresponding to the zero crossings of its rf. excitation, typically in tens of MHz. In FIG. 3, such a system is illustrated showing the YAG lasing medium 70 on an optical axis 72 extending between a 100% reflecting mirror 74 and an output mirror 76 transparent to the green beam, but reflective of the infrared beam. A Brewster angle polarizer 78 is provided, as above, along the axis 72 with a loss modulator 80 having a coating 82 reflective of green, frequency doubled radiation, but transmissive of the infrared beam from the YAG medium 70. A second harmonic generator 84 is located along the axis 72 next to the output mirror 76. As above, the system is operated to provide two green beams 86 and 88 from the output mirror 76 and reflective coating 82. The loss modulator 80 may be oriented to act as a Brewsters angle plate as well. A further filter 90 may be added as above to filter the vestigial infrared radiation from the output beam 88.

Figure 5:
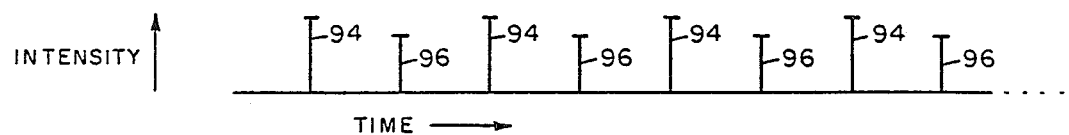
FIG. 5 is a timing diagram useful in explaining FIG. 3.

An optical delay 92 of predetermined length is inserted in the path of beam 88 to adjust the timing between mode locked pulses in output beams 86 and 88 as applied to a utilization device, such as the dye cell 42 in FIG. 2 in substitution for beams 30 and 40. The desired timing sequence is thus adjusted as illustrated in FIG. 5 in which pulses 94 and 96 correspond respectively to the occurrences of pulses in beams 86 and 88 respectively. By adjustment of delay 92 the pulses can be evenly distributed in time as shown in FIG. 5 when they reach cell 42. The advantage of this operation is that the green excitation radiation provides more frequent pulses of orange radiation from the cell 42 so that subsequent amplifier stages are less likely to degenerate into uncontrolled self-lasing between pulses.

The pulses in beams 86 and 88 may differ in amplitude as shown in FIG. 5 by using attenuation in beam 88 path for example. A partially transmissive or reflective attenuator 98 may be used for this purpose.

Figure 4:
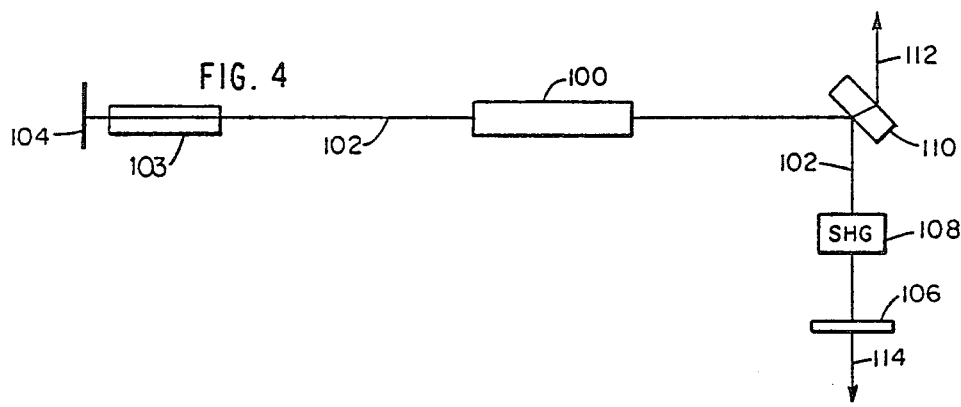
FIG. 4 is a schematic diagram of a second alternative to the diagram of FIG. 1.

A further and preferred alternative is illustrated in FIG. 4. As shown there, a YAG medium 100 is located on an optical axis 102 having a 100% reflector 104, a Q switch 103, loss modulator 80, and an infrared reflecting, green transmitting mirror 106. A second harmonic generator 108 is located on axis 102 adjacent mirror 106. A Brewsters angle plate 110 is provided to deflect the radiation along axis 102 of the proper polarization for the infrared beam, but will transmit the oppositely polarized radiation in the green beam to provide a second green output beam 112 in addition to a main output beam 114. Plate 110 may be coated as desired to improve its combined reflective, transmissive function. The Q switch 103 establishes and regulates the time of occurrence of the infrared pulse envelope in the cavity within which pulses 94 and 96, for example, occur.

The above-described preferred embodiment for the present invention is not intended to be limiting but exemplary, various alternatives and improvements being intended to fall within the scope of the invention. It is accordingly intended that the scope of the present invention is to be gathered solely from the following claims.

What is claimed is:

1. A system for deriving multiple beams of output radiation from a frequency converting element comprising:
    means for generating radiation of a first frequency;
    a frequency shifting element responsive to said radiation for providing a shift in the frequency thereof;
    means for applying the radiation of said first frequency through said frequency shifting element in a plurality of distinct directions to produce a corresponding plurality of beams of frequency shifted radiation;
    first means responsive to a first one of said plurality of frequency shifted beams for applying it to a region for excitation;
    second means responsive to a second one of said plurality of frequency shifted beams of radiation for applying that radiation to a region for excitation.

2. The system of claim 1 wherein the first and second mentioned regions are the same.

3. The system of claim 1 wherein said means for generating radiation of said first frequency includes a YAG crystal, and said radiation of said first frequency is in the infrared.

4. The system of claim 1 wherein said frequency shifting element includes a frequency doubling crystal.

5. The system of claim 4 wherein said first frequency is infrared radiation corresponding in frequency to the output of a YAG laser.

6. The system of claim 1 wherein said frequency shifting element is operative to cause said plurality of beams of radiation of shifted frequency to include radiation from said frequency shifting element travelling with said first radiation along first and second paths from said crystal.

7. The system of claim 6 further including a cavity for the radiation of said first frequency from said generating means, having said frequency shifting element therein and including said first and second paths along a radiation axis for the radiation from said generating means through said cavity.

8. The system of claim 1 further including means associated with at least one of said first and second applying means for filtering the radiation of said first frequency from the radiation of shifted frequency.

9. The system of claim 1 further including a dye channel defining said regions, said channel having a dye solution flowing therethrough.

10. The system of claim 9 wherein said regions are the same.

11. The system of claim 9 further including a cavity having said dye channel along an optical axis thereof.

12. The system of claim 11 wherein:
said first means for applying radiation includes means for applying frequency shifted radiation through one end of said cavity to said dye channel; and
said second means for applying radiation includes means for applying frequency shifted radiation to said flowing dye solution slightly off-axis from said cavity.

13. The system of claim 12 wherein said cavity is defined by first and second mirrors with said first mirror substantially transmissive to radiation of said shifted frequency through which the radiation from said first applying means passes; and said second mirror is provided as an output mirror for radiation from said dye channel of a frequency distinct from and lower than said frequency of said frequency shifted radiation.

14. The system of claim 12 wherein said means for applying off-axis includes a lens segment.

15. The system of claim 10 wherein said first and second applying means include means for applying said radiation to said dye channel in substantially the same polarization.

16. The system of claim 1 wherein said generating means provides said first frequency in the infrared spectral region and said shifted frequency in the green spectral region.

17. The system of claim 1 wherein:
means are provided for maintaining a predetermined polarization for the radiation of said first frequency;
said frequency shifting element provides said plurality of beams of frequency shifted radiation in a distinct polarization.

18. The system of claim 17 wherein:
said first applying means includes means for transmitting said second frequency and for reflecting said first frequency; and
said second applying means includes said means for maintaining polarization and being further operative to separate said second frequency from the radiation of said first frequency.

19. The system of claim 1 further including means for causing the radiation of said first frequency to be generated in temporally distinct pulses whereby said first and second beams also contain pulses.

20. The system of claim 19 wherein said pulse causing means includes a Q switch.

21. The system of claim 19 wherein:
said first and second applying means apply radiation to the same region; and
means are provided for providing time staggered application of the pulses in said first and second beams to said region.

22. The system of claim 21 further including means for applying the pulses in said first and second beams to said region in different amplitudes.

23. The system of claim 21 wherein said region includes a laseable medium.

24. The system of claim 23 wherein said first and second applying means include means for causing lasing by said laseable medium at different times for said first and second beams.

25. The system of claim 1 further including means for generating said first frequency as a set of modes.

26. In a system of the type providing frequency shifted radiation from a frequency shifting element on the optical axis of the cavity of a laser having a source of radiation of a first frequency with the cavity including a mirror along the cavity axis reflective at the first frequency and transmissive at the shifted frequency to provide an output beam of shifted radiation, the improvement for augmenting the available radiation therefrom comprising:
means within said cavity and positioned along said axis to receive radiation of shifted frequency along said axis resulting from the action of said shifting element on radiation of said first frequency reflected by said mirror, said means operative for spatially separating said frequency shifted radiation received thereby from the radiation of said first frequency along said axis to provide a further output beam of frequency shifted radiation; and
means for applying said output and further output beams to a region to produce excitation.

27. The system of claim 26 further including means for applying said output and further output beams of radiation to a lasing medium in the same polarization.

28. The system of claim 26 wherein said separating means includes:
a polarizing filter for the radiation of said first frequency; and
a coating on said filter to produce transmission at one of said first and shifted frequencies and reflection at the other of said first and shifted frequencies.

* * * * *